Patented May 28, 1935

2,002,612

UNITED STATES PATENT OFFICE 2,002,612

N-SUBSTITUTED DERIVATIVE OF SULPHOANILINES

Wilhelm Neelmeier and Wilhelm Meiser, Leverkusen-I. G.-Werk, Germany, assignors to General Aniline Works, Inc., New York, N. Y., a corporation of Delaware No Drawing. Application September 21, 1933, Serial No. 690,497. In Germany September 29, 1932

5 Claims. (Cl. 260—109)

The present invention relates to new derivatives of aniline, more particularly it relates to compounds of the probable general formula:

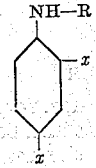

wherein R stands for alkyl, aralkyl or hydroaryl, such as methyl, ethyl, propyl, benzyl and cyclohexyl, one $x$ stands for a sulphonic acid group and the other $x$ stands for a sulphonic or for a carboxylic acid group.

In accordance with the present invention these products are prepared by causing a primary amine of the aliphatic, araliphatic or hydroaromatic series, such as methylamine, ethylamine, propylamine, butylamine, isobutylamine, benzylamine and cyclohexylamine, to act upon a halogenbenzene of the probable general formula:

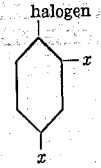

wherein one $x$ stands for a sulphonic acid group and the other $x$ stands for a sulphonic or carboxylic acid group, in an aqueous medium and at elevated temperature.

The temperatures used may be varied between the widest limits. As a general rule, however, there may be stated that the process may be carried out at temperatures between about 50 and about 200° C.; advantageously the process is carried out at temperatures between about 100 and 150° C. with the addition of copper or a copper compound as catalyst and with excess alkyl-, aralkyl- or hydroaryl-amine.

Our new compounds are generally colorless substances, forming easily water soluble alkali metal salts; they are valuable intermediate products in the manufacture of dyestuffs and synthetic drugs.

The invention is illustrated by the following examples, without being limited thereto, the parts being by weight:

*Example 1.*—316.5 parts of the neutral sodium salt of chlorobenzene-2.4-disulphonic acid are heated in an autoclave for 20 hours at 130° C. with 100 parts of water, 500 parts of an aqueous monomethylamine solution of 50% strength, 1 part of copper powder and 1.5 parts of cuprous chloride. After cooling, the reaction mixture is rendered alkaline to caustic soda, and the excess methylamine is distilled off with steam. From the remainder the copper is filtered, and the filtrate contains the methylaniline-2.4-disulphonic acid of the formula:

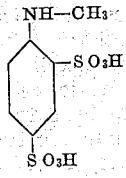

in a yield of 95% of theory.

*Example 2.*—238 parts of the neutral sodium salt of chlorobenzene-4-sulpho-2-carboxylic acid (of a content of 85%) are refluxed for 10 hours with stirring with 80 parts of water, 240 parts of n-butylamine, one part of copper powder and 0.5 part of cuprous chloride. The working up is performed as described in Example 1. The n-butylaniline-4-sulpho-2-carboxylic acid, of the formula:

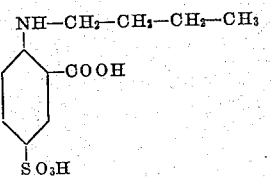

is precipitated as acid sodium salt in form of colorless crystals by concentrating the solution and acidifying the same.

In an analogous manner there is obtained the n-butylaniline - 2 - sulpho - 4 - carboxylic acid by starting with chlorobenzene - 2 - sulpho - 4 - carboxylic acid.

By substituting the n-butylamine by equivalent quantities of methylamine or ethylamine or n-propylamine or isobutylamine or isoamylamine or benzylamine or cyclohexylamine, there are obtained in quite the same manner methyl-, ethyl-, n-propyl-, isobutyl-, isoamyl-, benzyl- or cyclohexyl-aniline-4-sulpho-2-carboxylic acid, having similar properties.

*Example 3.*—118 parts of chlorobenzene-2-sulpho-4-carboxylic acid are dissolved with 100 parts of water and 120 parts of aqueous caustic soda lye of 33% strength to a neutrally reacting solution. Thereto are added 300 parts of isobutylamine, and the mixture is heated in an autoclave for 20 hours at 130° C. with stirring with the addition of copper powder and 0.5 part of cuprous chloride. After cooling, 70 parts of aqueous caustic soda lye of 33% strength are added, and the excess isobutylamine is distilled off with steam. The copper is filtered, the filtrate is neutralized by the addition of hydrochloric acid, and the isobutylaniline-2-sulpho-4-carboxylic acid of the formula:

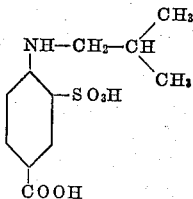

is precipitated in form of a colorless powder by the addition of formic acid.

We claim:
1. Compounds of the general formula:

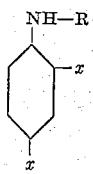

wherein R stands for alkyl, a radical of the cyclohexyl or benzyl series, one $x$ stands for a sulphonic acid group and the other $x$ stands for a sulphonic or for a carboxylic acid group, being generally colorless substances, forming easily water soluble alkali metal salts and being valuable intermediate products in the manufacture of dyestuffs and synthetic drugs.

2. Compounds of the general formula:

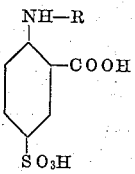

wherein R stands for alkyl, a radical of the cyclohexyl or benzyl series, being generally colorless substances, forming easily watersoluble alkali metal salts and being valuable intermediate products in the manufacture of dyestuffs and synthetic drugs.

3. Compounds of the general formula:

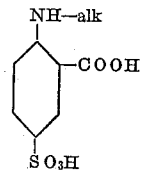

wherein alk stands for alkyl of 1 to 5 carbon atoms, being generally colorless substances, forming easily watersoluble alkali metal salts and being valuable intermediate products in the manufacture of dyestuffs and synthetic drugs.

4. The compound of the following formula:

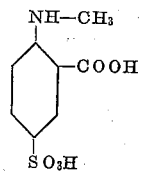

being a colorless substance, forming easily watersoluble alkali metal salts and being a valuable intermediate product in the manufacture of dyestuffs and synthetic drugs.

5. The compound of the following formula:

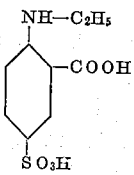

being a colorless substance, forming easily watersoluble alkali metal salts and being a valuable intermediate product in the manufacture of dyestuffs and synthetic drugs.

WILHELM NEELMEIER.
WILHELM MEISER.